July 20, 1926.

W. C. MARTIN 1,592,952

FRICTION DRIVE MECHANISM

Filed July 27, 1925　　2 Sheets-Sheet 1

Inventor

William C. Martin.

By Frease and Bond
Attorneys

July 20, 1926.
W. C. MARTIN
FRICTION DRIVE MECHANISM
Filed July 27, 1925
1,592,952
2 Sheets-Sheet 2
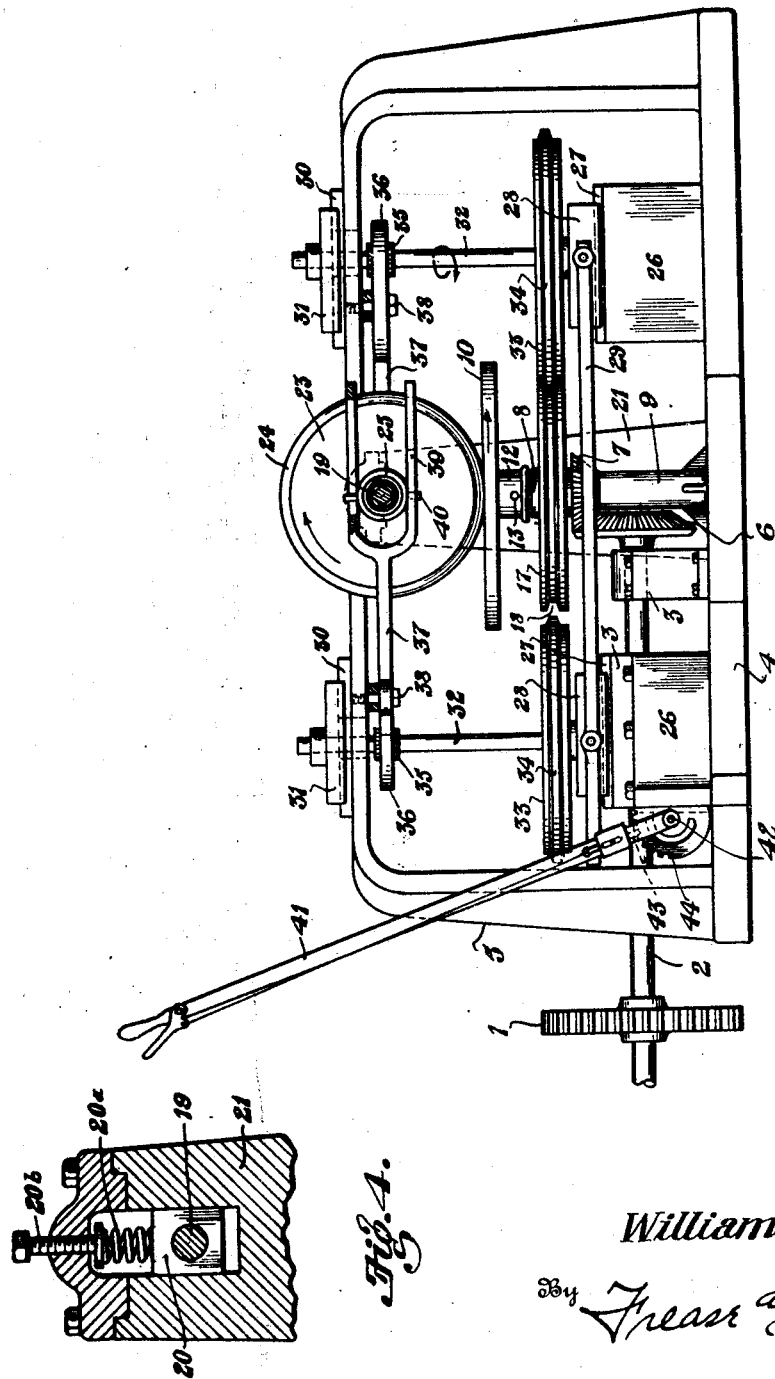
Inventor
William C. Martin.
By Frease and Bros
Attorneys Patented July 20, 1926.

1,592,952

UNITED STATES PATENT OFFICE.

WILLIAM C. MARTIN, OF CANTON, OHIO.

FRICTION-DRIVE MECHANISM.

Application filed July 27, 1925. Serial No. 46,288.

This invention relates to friction drive mechanism especially designed for use upon gasoline engine, steam, or electrically operated power shovels, such as are used for excavating, and other apparatus.

The objects of the invention are to provide a friction drive through which power may be transmitted from an internal combustion engine to the turn table and boom of the power shovel; means being provided for easily and quickly increasing or decreasing the speed of the drive and reversing the motion of the same; the parts being so arranged that the drive may normally stand in neutral position while the engine is operating.

The invention further contemplates the provision of means whereby the drive mechanism may be started at a low speed which is gradually increased during operation, this being especially desirable for operation of the boom which carries the excavating shovel, eliminating sudden jolts or jars upon the boom when the shovel is operated for excavating purposes.

Figure 1:
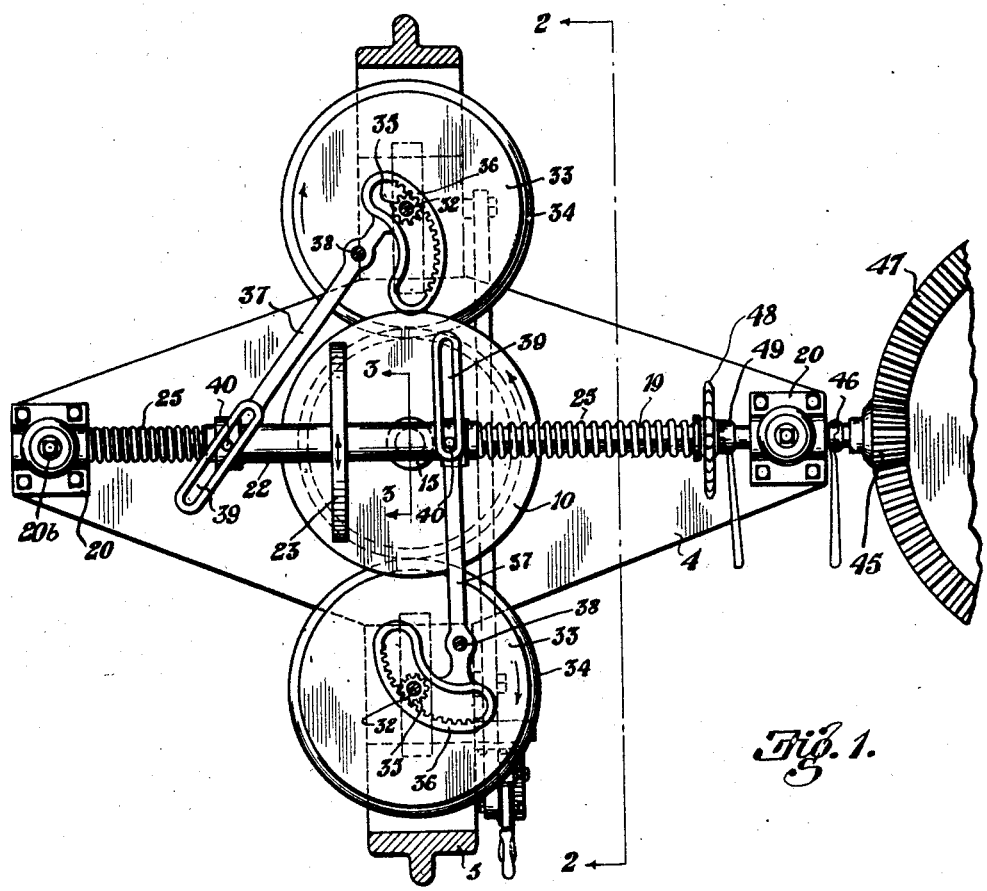
Figure 3:
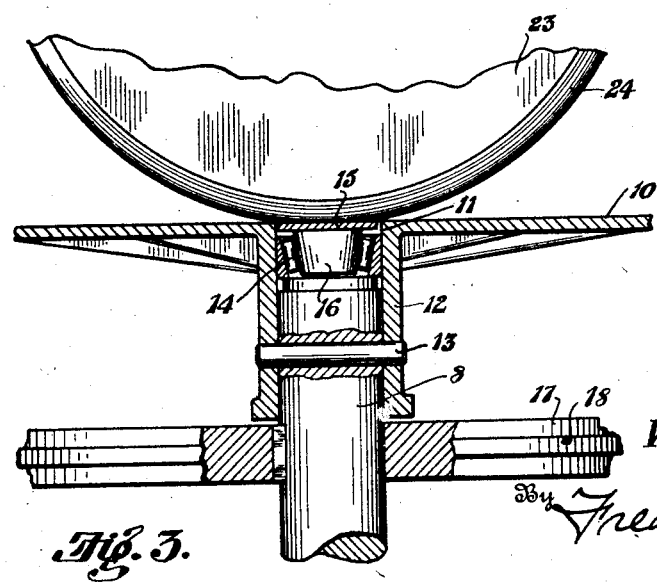

An embodiment of the invention is illustrated in the accompanying drawing, in which, Figure 1, is a plan sectional view of a friction drive gearing embodying the invention;

Fig. 2, a section on the line 2—2, Fig. 1;

Fig. 3, an enlarged detail section on the line 3—3, Fig. 1, and

Fig. 4, a detail view of one of the bearings.

Similar numerals of reference indicate corresponding parts throughout the drawings.

Power is transmitted to the friction drive mechanism through the gear 1, to the shaft 2, which is journaled in bearings 3, supported upon the base 4, of the vertical, rectangular frame 5. A bevel gear 6, is mounted upon the shaft 2, and meshes with a bevel pinion 7, mounted upon the vertical, central shaft 8, which is journaled in a vertical bearing 9, supported upon the central portion of the base plate, as illustrated.

The metal friction disk 10, is provided with the central opening 11, surrounded by the depending annular flange 12, which receives the upper end portion of the shaft 8, being fixed thereto as by a pin 13.

As best illustrated in Fig. 3, the upper end of the shaft 8, terminates a considerable distance below the surface of the friction disk 10, forming a socket in which is located a roller bearing 14, a disk 15, flush with the surface of the friction disk 10, being located in said socket and provided with the conical boss 16, mounted within the roller bearing 14, whereby the friction disk 10, may rotate independently of the disk 15.

A friction pulley 17, is fixed upon the shaft 8, preferably between the pinion 7, and friction disk 10, and is provided with the annular groove 18, in its periphery, flared outward as shown in Fig. 2.

A shaft 19, diametrically disposed to the axis of the friction disk 10, is journaled in a pair of bearings 20, mounted upon standards 21, at opposite ends of the base plate 4, the central portion of this shaft being squared and having a sleeve 22, provided with a squared interior, slidably mounted thereon.

Each of the bearings 20, is slidably mounted for vertical movement, as best shown in Fig. 4, a spring 20ª being arranged to force the bearing downward, and being adjusted by a screw 20ᵇ, whereby any desired tension may be placed upon the springs in order to force the pulley 23, into frictional engagement with the friction disk.

The friction roller 23, provided with a tire 24, of fibre or other suitable friction material, is fixed at the center of the sliding sleeve 22, coil springs 25, surrounding the end portions of the shaft and being arranged to normally hold the sleeve centrally located thereon, holding the friction pulley 23, in neutral position, in engagement with the disk 15, permitting the friction disk 10, to continuously rotate while the friction pulley 23, remains idle.

A block 26, provided with a guide rib 27, is fixed upon the base plate on each side of the shaft 8, a sliding bearing 28, being mounted upon each of said guide ribs and connected together as by the link 29.

Guide ribs 30, are provided above the rib 27, in the rectangular frame 5, sliding bearings 31, being mounted upon said ribs 30. A vertical countershaft 32, is journaled in each pair of bearings 28 and 31, and has fixed thereon a friction pulley 33, provided with an annular rib 34 for selective engagement with the annular groove 18, of the friction pulley 17.

A pinion 35, is fixed upon the upper portion of each of the shafts 32, each of said pinions meshing with a gear segment 36, mounted upon a lever 37, said levers being pivoted as at 38, to a stationary portion of the rectangular frame and provided with the slotted inner ends 39, engaging the pins 40, upon the end portions of the slidable sleeve 22.

The link 29, may be connected to a hand operated lever 41, pivoted as at 42, to a stationary portion of the base and provided with the pawl and ratchet 43 and 44, to hold the link in any desired position.

A bevel pinion 45 may be provided upon the shaft 19 and arranged to be controlled thereon as by the clutch 46, said pinion meshing with a bevel gear 47, for rotating the usual turntable of the power shovel. A sprocket wheel 48 may be mounted upon the shaft 19, and arranged to be operatively connected thereto as by the clutch 49, said sprocket wheel being adapted to be operatively connected, by any suitable chain gearing to the boom which carries the shovel.

It may be preferable, however, to provide two complete mechanisms, such as illustrated, upon a single power shovel, one of the mechanisms being arranged to operate the turntable and the other being provided for driving the boom.

The friction disk 10 may be normally, continuously rotated, through the gearing above described, in the direction of the arrow shown in Figure 1, the friction pulley 23 standing in the neutral position, resting upon the disk 15, as shown in Figure 3.

In order to operate the friction drive, in either direction, the link 29 is slidably moved, by means of the lever 41, to move either one of the friction pulleys 33 into engagement with the pulley 17, and through the corresponding pinion 35 and segment 36, the friction pulley 23 is moved across the face of the friction disk 10, transmitting motion to the shaft 19, and by operating either of the clutches 46 or 49 the turntable or boom may be operated in the desired direction.

In using the apparatus upon a power shovel, it is preferable to have a quicker operation of the shovel in coming back than when the same is "crowding out", and this may be compensated for by so adjusting the bearings 20 that the shaft 19 will be slightly inclined with reference to the friction disk, permitting the friction pulley to move more easily across the one side of the disk.

I claim:

1. A friction drive including a rotating friction disk having an open center, a second disk journaled in the open center of the friction disk and movable independently thereof, a shaft journaled above the friction disk and parallel thereto, a friction pulley slidably mounted upon said shaft and arranged to engage the surface of the friction disk, and springs upon the shaft for normally holding the friction pulley in engagement with said second mentioned disk.

2. A friction drive including a rotating friction disk having an open center, a second disk journaled in the open center of the friction disk and movable independently thereof, a shaft journaled above the friction disk and parallel thereto, a friction pulley slidably mounted upon said shaft and arranged to engage the surface of the friction disk, and means upon the shaft for normally holding the friction pulley in engagement with said second mentioned disk.

3. A friction drive including a driven shaft, a friction disk mounted upon said shaft, a friction pulley upon said shaft, a shaft journaled at right angles to the driven shaft, a second friction pulley slidably mounted upon said second mentioned shaft and arranged to engage the surface of the friction disk, a counter shaft parallel to the driven shaft, a friction pulley upon the counter shaft arranged to engage the periphery of the first mentioned friction pulley and means associated with said counter shaft for moving the second mentioned friction pulley across the face of the friction disk 4. A friction drive including a driven shaft, a friction disk mounted upon said shaft, a friction pulley upon said shaft, a shaft journaled at right angles to the driven shaft, a second friction pulley slidably mounted upon said second mentioned shaft and arranged to engage the face of the friction disk, a counter shaft parallel to the driven shaft, a friction pulley upon the counter shaft arranged to engage the periphery of the first mentioned pulley, a pinion upon the second shaft, and a lever operatively associated with the second named friction pulley and provided with a gear segment engaging said pinion for moving the second mentioned friction pulley across the face of the friction disk.

5. A friction drive including a driven shaft, a friction disk mounted upon said shaft, a friction pulley upon said shaft, a shaft journaled at right angles to the driven shaft, a second friction pulley slidably mounted upon said second mentioned shaft and arranged to engage the surface of the friction disk, a counter shaft parallel to the driven shaft, a friction pulley upon the counter shaft arranged to engage the periphery of the first mentioned friction pulley and means associated with said counter shaft for moving the second mentioned friction pulley across the face of the friction disk, and means for moving said counter shaft laterally towards and from the driven shaft.

6. A friction drive including a driven shaft, a friction disk mounted upon said shaft, a friction pulley upon said shaft, a shaft journaled at right angles to the driven shaft, a second friction pulley slidably mounted upon said second mentioned shaft and arranged to engage the face of the friction disk, a counter shaft parallel to the driven shaft, a friction pulley upon the counter shaft arranged to engage the periphery of the first mentioned pulley, a pinion upon the second shaft, and a lever operatively associated with the second named friction pulley and provided with a gear segment engaging said pinion for moving the second mentioned friction pulley across the face of the friction disk, and means for moving said counter shaft laterally towards and from the driven shaft.

7. A friction drive including a driven shaft, a friction disk mounted upon said shaft, a shaft journaled at right angles to the driven shaft, a friction pulley slidably mounted upon said second mentioned shaft and arranged to engage the face of the friction disk, a counter shaft parallel to the driven shaft, means for operatively connecting the counter shaft with the driven shaft, a pinion upon the counter shaft and a lever operatively associated with the friction pulley and having a gear segment engaging the pinion for moving the friction pulley across the face of the friction disk.

8. A friction drive including a driven shaft, a friction disk mounted upon said shaft, a friction pulley upon said shaft, a second friction pulley slidably mounted upon said second mentioned shaft and arranged to engage the face of the friction disk, a counter shaft upon each side of the driven shaft and parallel thereto, a friction pulley upon each counter shaft arranged to engage the periphery of the first mentioned friction pulley, means for laterally moving said counter shafts in unison, and means associated with said counter shafts for moving the second mentioned friction pulley across the face of the friction disk.

9. A friction drive including a driven shaft, a friction disk mounted upon said shaft, a friction pulley upon said shaft, a shaft journaled at right angles to the driven shaft, a second friction pulley slidably mounted upon said second mentioned shaft and arranged to engage the face of the friction disk, a counter shaft upon each side of the driven shaft and parallel thereto, a friction pulley upon each counter shaft arranged to engage the periphery of the first mentioned friction pulley, means for laterally moving said counter shafts in unison, a pinion upon each counter shaft and a lever operatively associated with the second mentioned friction pulley and having a gear segment engaging each pinion for moving the second mentioned friction pulley across the face of the friction disk.

In testimony that I claim the above, I have hereunto subscribed my name.

WILLIAM C. MARTIN.